(12) United States Patent
Okayama

(10) Patent No.: US 6,427,037 B1
(45) Date of Patent: Jul. 30, 2002

(54) TWO-STAGE OPTICAL SWITCH CIRCUIT NETWORK

(75) Inventor: Hideaki Okayama, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/497,235

(22) Filed: Feb. 3, 2000

(30) Foreign Application Priority Data

Feb. 15, 1999 (JP) .......................................... 11-035937

(51) Int. Cl.[7] ................................................ G02B 6/35
(52) U.S. Cl. .......................................... 385/16; 385/17
(58) Field of Search ...................................... 385/16–17

(56) References Cited

U.S. PATENT DOCUMENTS

| | | | |
|---|---|---|---|
| 5,532,855 A | 7/1996 | Kato et al. | 359/117 |
| 6,044,185 A * | 3/2000 | MacDonald | 385/16 |

FOREIGN PATENT DOCUMENTS

| | | | |
|---|---|---|---|
| EP | 0 386 958 | 9/1990 | 385/147 X |
| JP | 9-46736 | 2/1997 | 385/147 X |

OTHER PUBLICATIONS

T. Nishi et al. "Optical Switch Architectures for Optical Path Cross–Connect" Proceedings of the 1998 General Conference of the Institute of Electronics, Information and Communication Engineers of Japan, B–10–97, Mar. 1998.

A. Watanabe et al. "8×16 Delivery and Coupling Switch Board for 320 Gbit/s Throughput Optical Path Cross–Connect System" Electronics Letters, vol. 33, No. 1, pp. 67–68, Jan. 2, 1997.

(1) English Language Abstract No. XP–002142425 of JP 08 251632.

(2) English Language Abstract of JP 08 251632.

(3) English Language Abstract of JP 09 046736.

(4) English Language Abstract of JP 10 257030.

* cited by examiner

*Primary Examiner*—Brian Healy
*Assistant Examiner*—Sarah U Song
(74) *Attorney, Agent, or Firm*—Venable; Robert J. Frank; Michael A. Sartori

(57) ABSTRACT

An optical switch circuit network includes r input optical switches 102a each having n input ports, m 1×r optical switches 125a, and an n×m optical switch for switching a path connecting the input ports and the 1×r optical switches, and r output optical switches 125 each having r×1 optical switches, n output ports, and an m×n optical switch for switching a path connecting the output ports and 1×r optical switches. The i-th 1×r optical switch of each input optical switch is connected to the i-th r×1 optical switch of each output optical switch.

8 Claims, 15 Drawing Sheets

TWO-STAGE OPTICAL SWITCH CIRCUIT NETWORK

BACKGROUND OF THE INVENTION

1. Field of the Invention

The present invention relates to an optical switch circuit network for controlling paths for the propagation of optical signals.

2. Description of the Background Art

It has been customary to implement a number of input ports and output ports, i.e., a large-scale architecture with optical switches by sequentially combining the optical switches. Various schemes heretofore proposed for combining optical switches include an optical path cross-connect system taught in T. Nishi, et al. "Optical Switch Architectures for Optical Path Cross-Connect", Proceedings of the 1998 General Conference of the Institute of Electronics, Information and Communication Engineers of Japan, B-10-97, March 1998. The cross-connect system constitutes an optical switch circuit network with optical matrix switches arranged in three consecutive stages. This, however, brings about a substantial loss in the optical matrix switches. Effective architectures for increasing the number of input ports and output ports with two stages of optical matrix switches have not been reported yet.

An optical switch circuit network using thermo-optical (TO) switches is disclosed in A. Watanabe, etal. "8×16 delivery and coupling switch board for 320 Gbit/s throughput optical path cross-connect system", Electronics Letters, Vol. 33, No. 1, pp. 67–68, Jan. 2, 1997. The TO switches each include means for switching an optical path by varying the resistance of an optical waveguide with heat. Each TO switch is located at the intersection of one input and one output. The network drives only one of the TO switches connected to a desired input and a desired output for the purpose of saving drive power.

However, the problem with the above TO switch scheme is that it has to serially connect TO switches equal in number to the inputs or the outputs and therefore results in a prohibitive total length. Specifically, when the TO switch scheme is used to construct an N×N optical switch circuit network, it is necessary to switch $N\log_2 N$ TO switches at the input port side and switch $N\log_2 N$ TO switches at the output port side. In the worst case, therefore, the network has to switch $2N\log_2 N$ TO switches in total.

SUMMARY OF THE INVENTION

It is therefore an object of the present invention to provide an optical switch circuit network needing only two stages of optical matrix switches.

It is another object of the present invention to provide an optical switch circuit network capable of scaling down the individual optical matrix switch.

It is a further object of the present invention to provide an optical switch circuit network which is short despite the use of TO switches and capable of reducing power necessary for driving TO switches while stabilizing the power.

In accordance with the present invention, an optical switch circuit network including nr (n and r being positive integers) input ports and nr output ports includes r input optical switches arranged at the input side and each having n of the nr input ports, m (m being a positive integer) 1×r optical switches and an n×m optical switch for selectively connecting the n input ports and m 1×r optical switches, and r output optical switches arranged at the output side and each having n of the nr output ports, m r×1 optical switches and an m×n optical switch for selectively connecting said n output ports and m r×1 optical switches. The i-th (i being an integer between 1 and m) 1×r optical switch of each of the input optical switches is connected to the i-th r×1 optical switch of each of the output optical switches.

Also, in accordance with the present invention, an optical switch circuit network including nr input ports and nr output ports includes r/h (h being a positive integer) input optical switches arranged at the input side and having nh of the nr input ports, m h×r optical switches and h n×m optical switches each being connected to a particular one of n of the nr input ports to thereby switch a path between the n input ports and said m h×r optical switches, and r/h optical output switches arranged at the output side and having nh of the nr output ports, m r×h optical switches and h m×n optical switches each being connected to particular one of n of the nr output ports to thereby switch a path between the n output ports and the m r×h optical switches. The i-th (i being an integer between 1 and m) h×r optical switch of each of the input optical switches is connected to the i-th r×h optical switch of each of the output optical switches by a tape-like optical fiber constituted by h connect lines.

Further, an optical switch circuit network including nr input ports and nr output ports of the present invention includes r/h input optical switches arranged at the input side and having nh of the nr input ports, m/h' (h' being a positive integer) nh×h'r optical switches and nh/h' h'×m/h' optical switches each being connected to particular one of h' of the nr input ports to thereby switch a path between the h' input ports and m/h' nh×h'r optical switches, and r/h output optical switches arranged at the output side and having nh of the nr output ports, m/h' h'r×nh optical switches and nh/h' m/h'×h' optical switches each being connected to particular one of h' of the nr output ports to thereby switch a path between the h' output ports and h'r×nh optical switches. The h'×m/h' optical switches each are connected to said nh×h' optical switches by tape-like optical fibers each comprising h' connect lines. The m/h' optical switches each are connected to the r/nh optical switches by tape-like optical fibers each having h' connect lines. The input optical switches are connected to the output optical switches by tape-like optical fibers each having h connect lines.

Moreover, in accordance with the present invention, an optical switch circuit network including N input ports and N output ports includes $2^n$ input sections each having $N/2^n$ of the N input ports, $2^n$ $N/2^n \times N/2^n$ input optical switches, and 1×2 optical switches arranged in an n-stage tree configuration and connecting the input ports and input optical switches, and $2^n$ output sections each having $N/2^n$ of the N output ports, $2^n$ $N/2^n \times N/2^n$ output optical switches, and 1×2 optical switches arranged in an n-stage tree configuration and connecting the output ports and output optical switches. The j-th (j being an integer between 1 and $2^n$) input optical switch of the i-th (i being an integer of $2^n$ or smaller) input section is connected to the i-th output optical switch of the j-th output section.

BRIEF DESCRIPTION OF THE DRAWINGS

The objects and features of the present invention will become more apparent from the consideration of the following detailed description taken in conjunction with the accompanying drawings in which.

In the drawings, identical reference numerals designate like structural elements.

DESCRIPTION OF THE PREFERRED EMBODIMENTS

To better understand the present invention, brief reference will be made to the general construction of an optical switch circuit network having a three-stage cross-connect configuration, shown in FIG. 1. As shown, the switch circuit network, generally 50, includes optical matrix switches 52$a$-1 through 52$a$-r arranged at the first stage, optical matrix switches 52$b$-1 through 52$b$-m arranged at the second stage, and optical matrix switches 52$c$-1 through 52$c$-r arranged at the third stage. The suffixes r and m are representative of positive integers.

Figure 1:
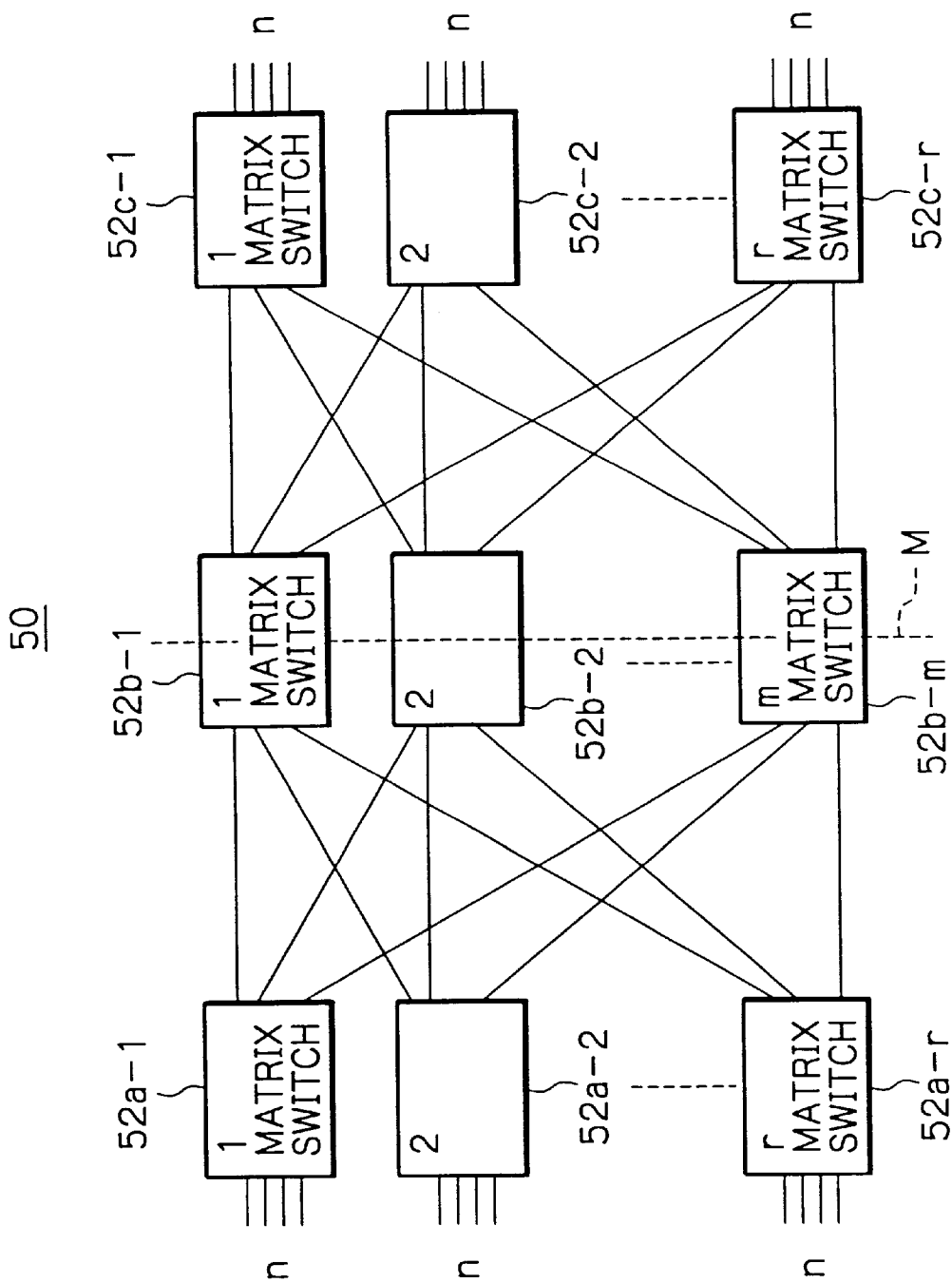
FIG. 1 is a block diagram schematically showing the general construction of an optical switch circuit network in which optical matrix switches are arranged in three consecutive stages.

In the specific network of FIG. 1, n input ports are connected to each of the matrix switches 52$a$-1 through 52$a$-r constituting the first stage. Likewise, n output ports are connected to each of the matrix switches 52$c$-1 through 52$c$-r constituting the thirdstage. The entire network 50 therefore has nr inputs and nr outputs, i.e., an nr×nr configuration.

The matrix switch 52$a$-1 included in the first stage is connected to all of the matrix switches 52$b$-1 through 52$b$-m of the second stage. Likewise, the other matrix switches 52$a$-2 through 52$a$-r of the first stage each are connected to all of the matrix switches 52$b$-1 through 52$b$-m of the second stage. Therefore, the matrix switches 52$a$-1 through 52$a$-r each have n inputs and m outputs, i.e., an n×m configuration.

The matrix switch 52$b$-1 included in the second stage is connected to all of the matrix switches 52$c$-1 through 52$c$-r of the third stage. Also, the other matrix switches 52$b$-2 through 52$b$-m of the second stage each are connected to all of the matrix switches 52$c$-1 through 52$c$-r of the third stage. Therefore, the matrix switches 52$b$-1 through 52$b$-m each have r inputs and r outputs, i.e., an r×r configuration. The matrix switches 52$c$-1 through 52$c$-r each have m inputs and n outputs, i.e., an m×n configuration.

The entire switch circuit network 50 therefore has nr inputs and nr outputs, as mentioned earlier. If a relation of $m \geq 2^n - 1$ is satisfied, then the network 50 is fully non-blocking, as well known in the art.

Figure 2:
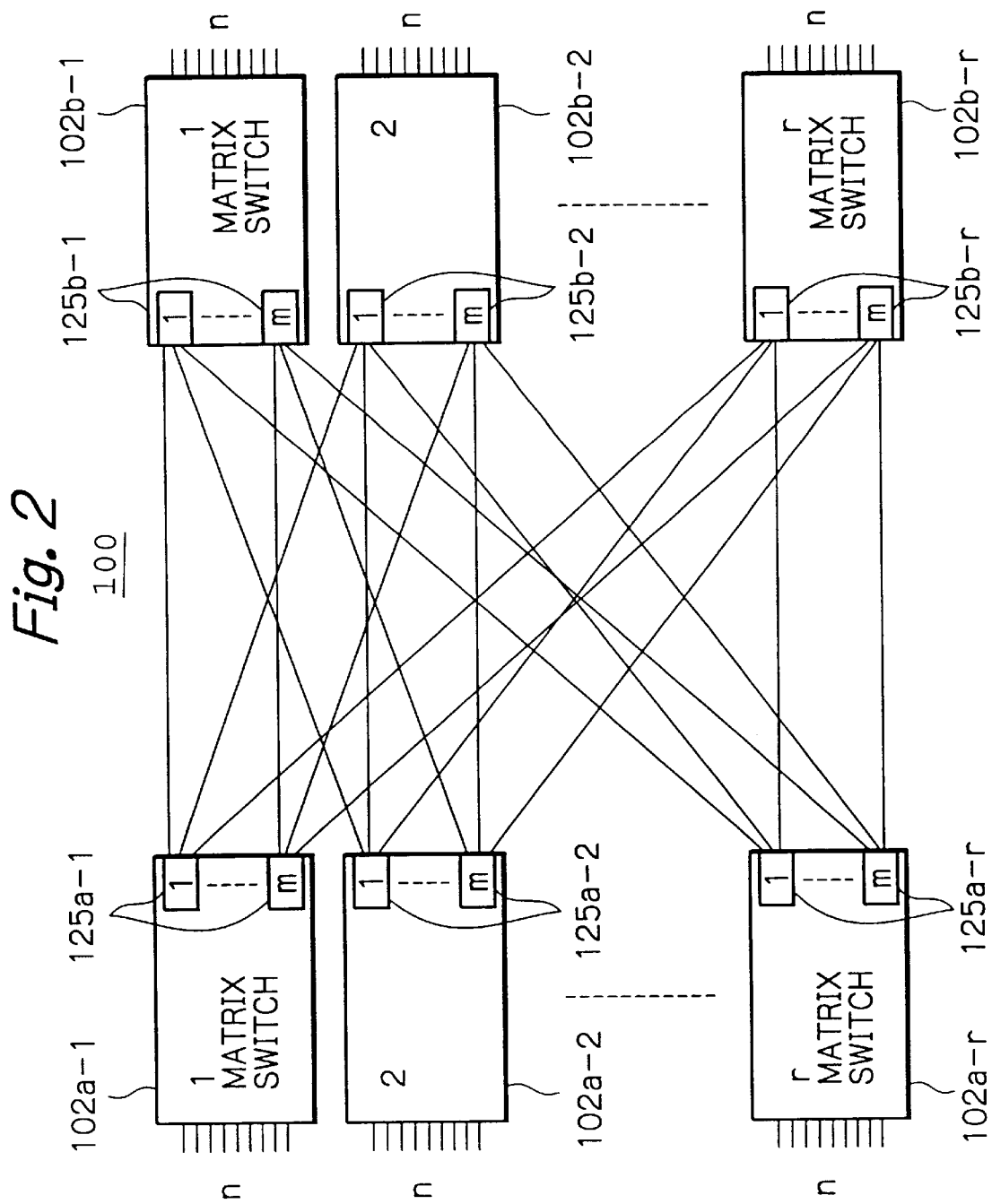
FIG. 2 is a schematic block diagram showing an optical switch circuit network embodying the present invention.

Referring to FIG. 2, an optical switch circuit network embodying the present invention is generally designated by the reference numeral 100. The illustrative embodiment constitutes an improvement over the conventional optical switch circuit network 50. As shown, the network 100 primarily differs from the network 50 in that it has optical matrix switches arranged only in two stages. Specifically, the network 100 is made up of optical matrix switches 102$a$-1 through 102$a$-r and optical matrix switches 102$b$-1 through 102$b$-r arranged at its input side and its output side, respectively.

Briefly, the matrix switches 102$a$-1 through 102$a$-r at the input side each are the combination of a corresponding one of the first-stage matrix switches 52$a$-1 through 52$a$-r of the conventional network 50 and a corresponding one of the input portions of the second-stage matrix switches 52$b$-1 through 52$b$-m. Likewise, the matrix switches 102$b$-1 through 102$b$-r at the output side each are the combination of a corresponding one of the third-stage matrix switches 52$c$-1 through 52$c$-r of the conventional network 50 and a corresponding one of the output portions of the second-stage matrix switches 52$b$-1 through 52$b$-m. The matrix switches 102$a$-1 through 102$a$-r and matrix switches 102$b$-1 through 102$b$-r are symmetrical in configuration to each other with respect to inputs and outputs. Let the following description concentrate on the arrangements of the first-stage matrix switches 102$a$-1 through 102$a$-r in order to avoid redundancy.

Figure 3:
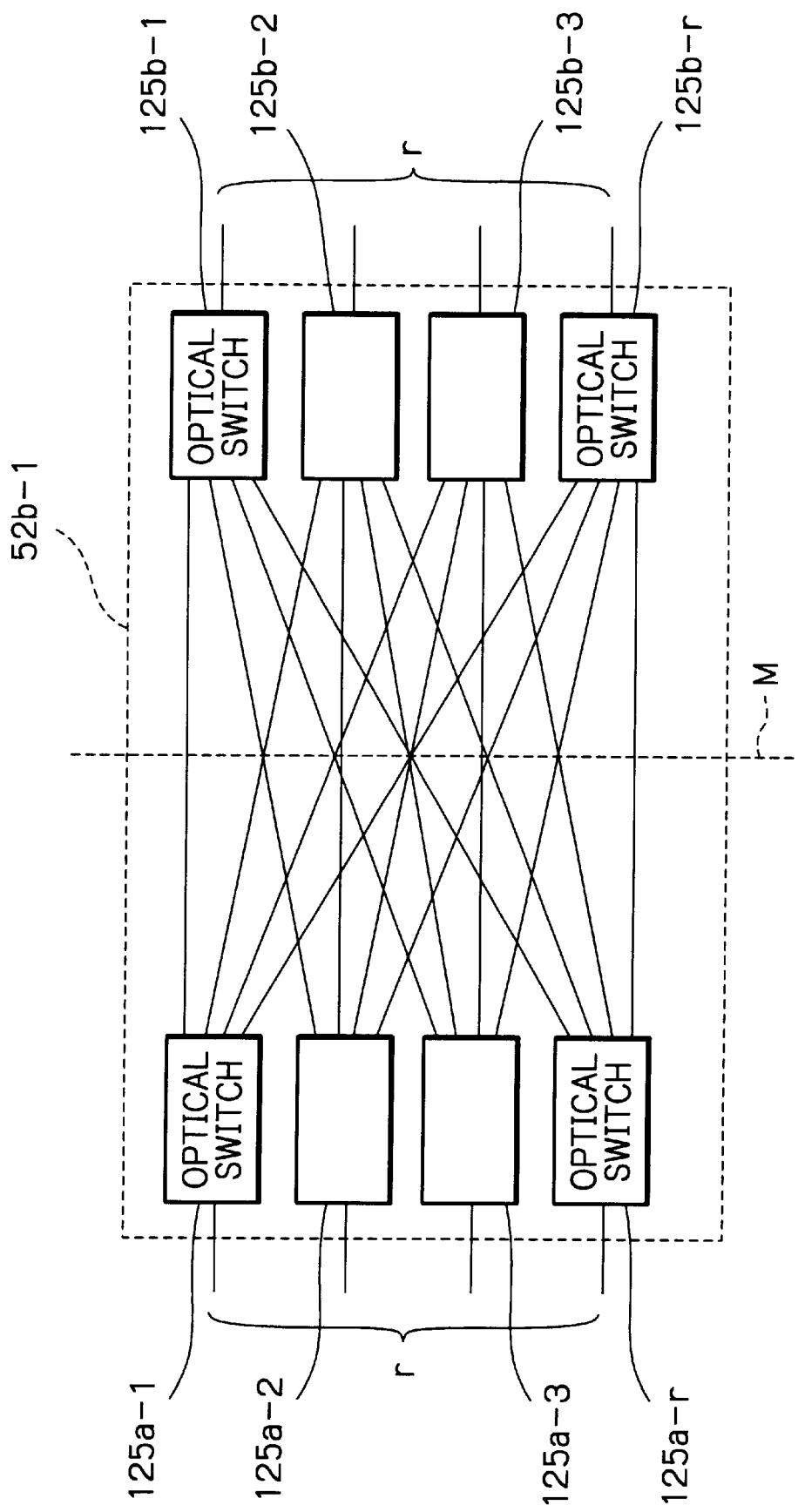
FIG. 3 is a schematic block diagram useful for understanding the configuration of an optical matrix switch included in the network of FIG. 2.

To constitute the matrix switches 102$a$-1 through 102$a$-r, assume that the second-stage matrix switches 52$b$-1 through 52$b$-m of the conventional network 50 each are divided into an input portion and an output portion at its center, and that the input portions of the matrix switches 52$b$-1 through 52$b$-m each are connected to the first-stage matrix switches 52$a$-1 through 52$a$-r. FIG. 3 shows a specific configuration of one of the matrix switches 52$b$-1 through 52$b$-m bisected at its center M. Because the matrix switches 52$b$-1 through 52$b$-m may have an identical configuration, only the matrix switch 52$b$-1 will be described by way of example with reference to FIG. 3.

As shown, the matrix switch 52$b$-1 includes optical switches 125$a$-1 through 125$a$-r respectively connected to the r inputs and optical switches 125$b$-1 through 125$b$-r respectively connected to the r outputs. In the specific configuration of FIG. 3, r is assumed to be 4 for the sake of illustration. The optical switches 125$a$-1 through 125$a$-r at the input side each have a single input and r outputs (1×r) while the optical switches 125$b$-1 through 125$b$-r each have r inputs and a single output (r×1). The optical switches 125$a$-1 through 125$a$-r each are cross-connected to all of the optical switches 125$b$-1 through 125$b$-r.

Each of the matrix switches 52$b$-1 through 52$b$-m includes the above optical switches 125$a$-1 through 125$a$-r. It follows that the entire switch circuit network 100 includes m optical switches 125$a$-1 through m optical switches 125$a$-r. In the following description, the m optical switches 125$a$-1 included in the input portions of the matrix switches 52$b$-1 through 52$b$-m are considered as a group. Generally, m optical switches 125$a$-i (i being an integer between 1 and r, inclusive) included in the input sides are considered as a group.

Figure 4:
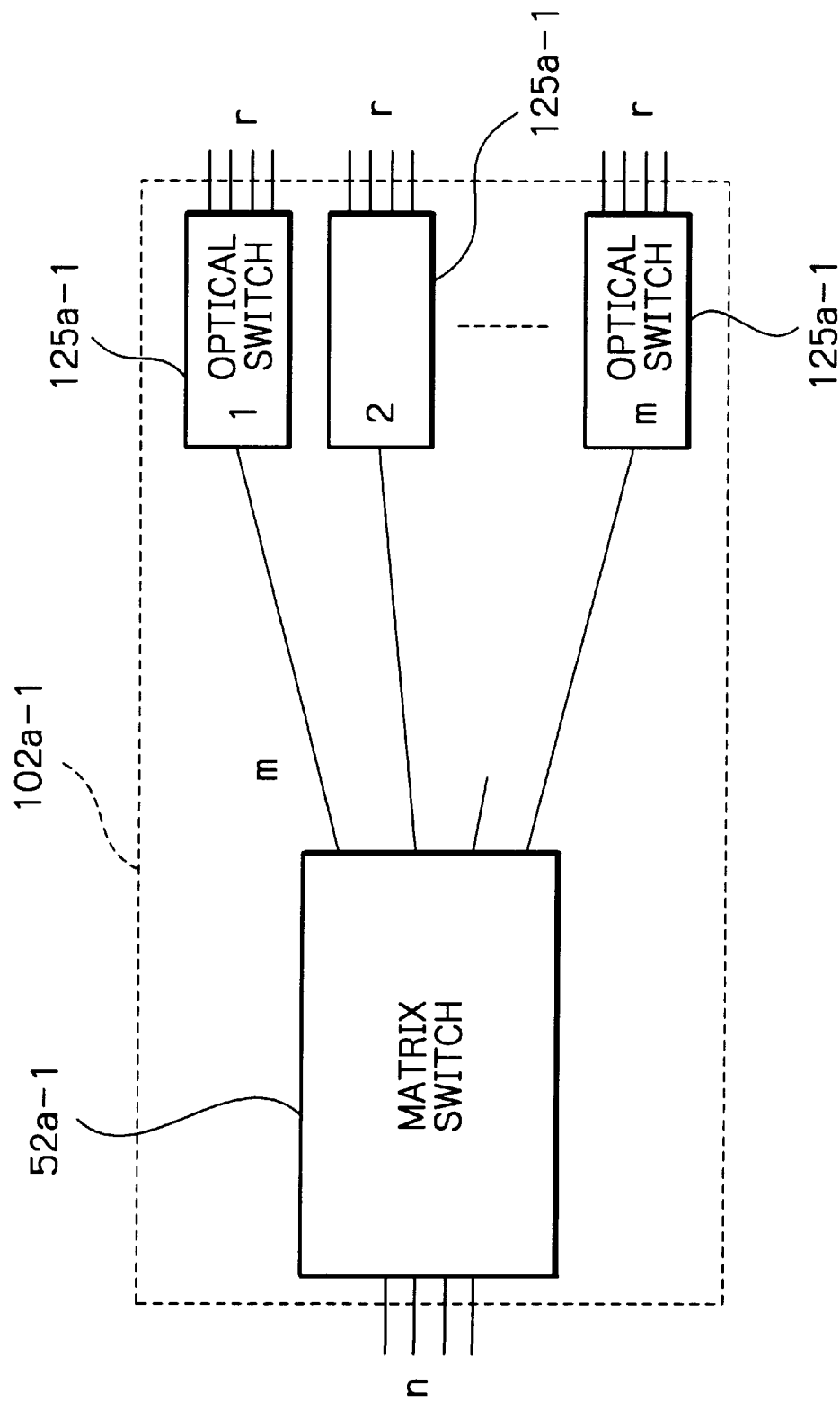
FIG. 4 is a schematic block diagram showing the optical matrix switch included in the network of FIG. 2.

As shown in FIG. 4, the matrix switch 102$a$-1, FIG. 2, included in the illustrative embodiment is a device implemented by the combination of the above group of m optical switches 125a-1 and first-stage matrix switch 52a-1, FIG. 1. The matrix switch 52a-1 has n inputs and m outputs, as stated earlier. The n inputs are respectively connected to the input ports of the network 100 of the illustrative embodiment while the m outputs are respectively connected to the m optical switches 125a-1. Generally, the matrix switch 102a-i (i being an integer between 1 and r, inclusive) of the network 100 is a device implemented by the combination of the group of m optical switches 125a-i and first-stage matrix switch 52a-i of the conventional network 50.

The matrix switches 102b-1 through 102b-r at the output side are identical in configuration with the matrix switches 102a-1 through 102a-r except for the following. The optical switches 125b-1 through 125b-r of each of the second-stage matrix switches 52b-1 through 52b-m are rearranged in the same manner as at the input side and combined with the third-stage matrix switches 52c-1 through 52c-r of the conventional network 50.

The switch circuit network 100 with the above configuration successfully implements the same number of input ports and output ports as the three-stage type network 50 only with two stages of matrix switches.

Figure 5:
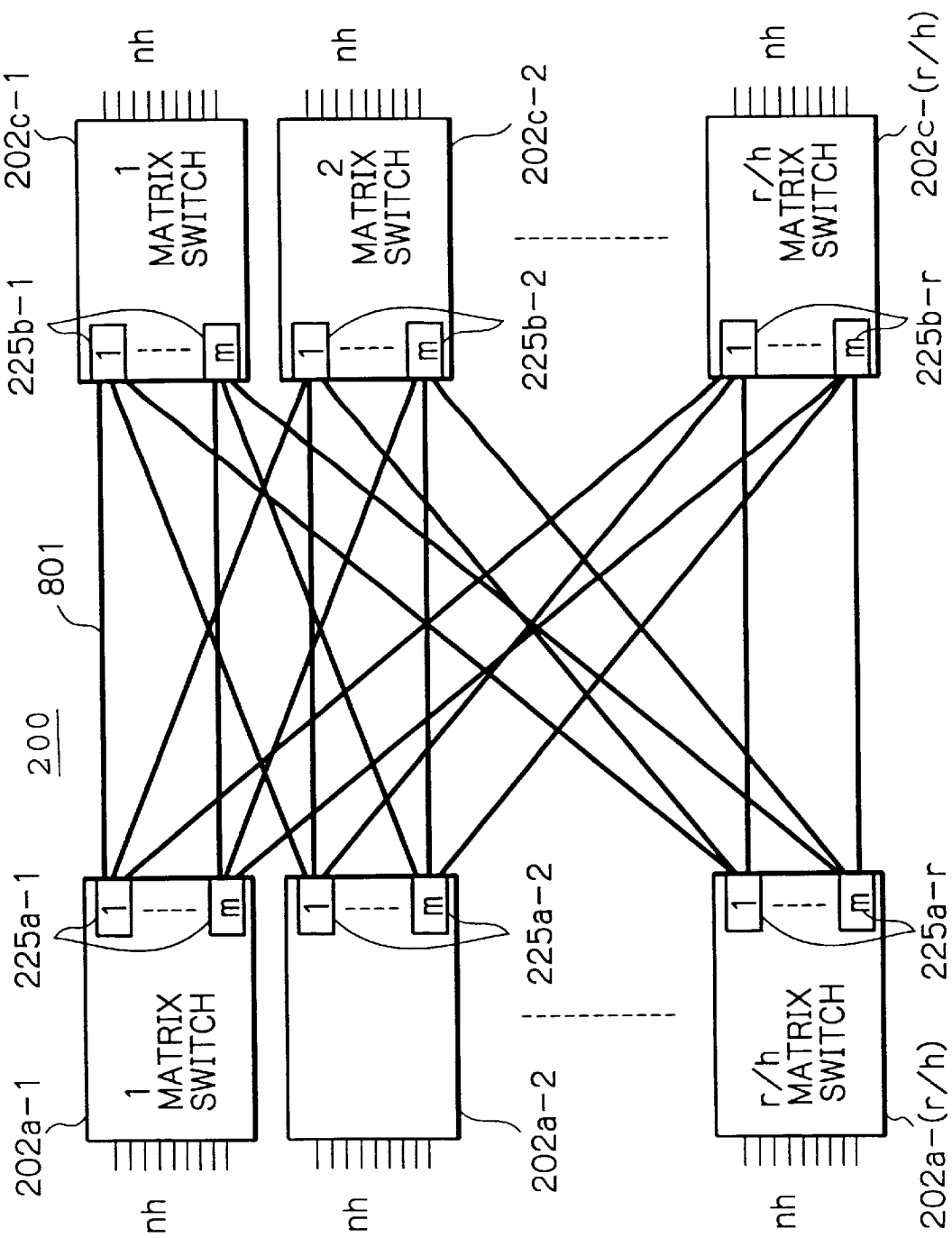
FIG. 5 is a schematic block diagram showing an alternative embodiment of the present invention.

Reference will be made to FIG. 5 for describing an alternative embodiment of the present invention. As shown, an optical switch circuit network, generally 200, has optical matrix switches 202a-1 through 202a-(r/h) at its input side and has optical matrix switches 202c-1 through 202c-(r/h) at its output side. The suffix h is representative of r or a smaller positive integer. The network 200 is representative of a more general configuration of the previous network 100 and identical with the network 100 when h is 1.

The matrix switches 202a-1 through 202a-(r/h) at the input side each are the combination of a corresponding one of the first-stage matrix switches 52a-1 through 52a-r of the conventional network 50 and the input portions of the second-stage matrix switches 52b-1 through 52b-m. Likewise, each of the matrix switches 202c-1 through 202c-(r/h) at the output side is the combination of a corresponding one of the third-stage matrix switches 52c-1 through 52c-r of the conventional network 50 and the output portions of the second-stage matrix switches 52b-1 through 52b-m. The matrix switches 202a-1 through 202a-(r/h) and matrix switches 202c-1 through 202c-(r/h) are symmetrical in configuration to each other with respect to inputs and outputs. Let the following description concentrate on the arrangements of the matrix switches 202a-1 through 202a-(r/h) in order to avoid redundancy.

Figure 6:
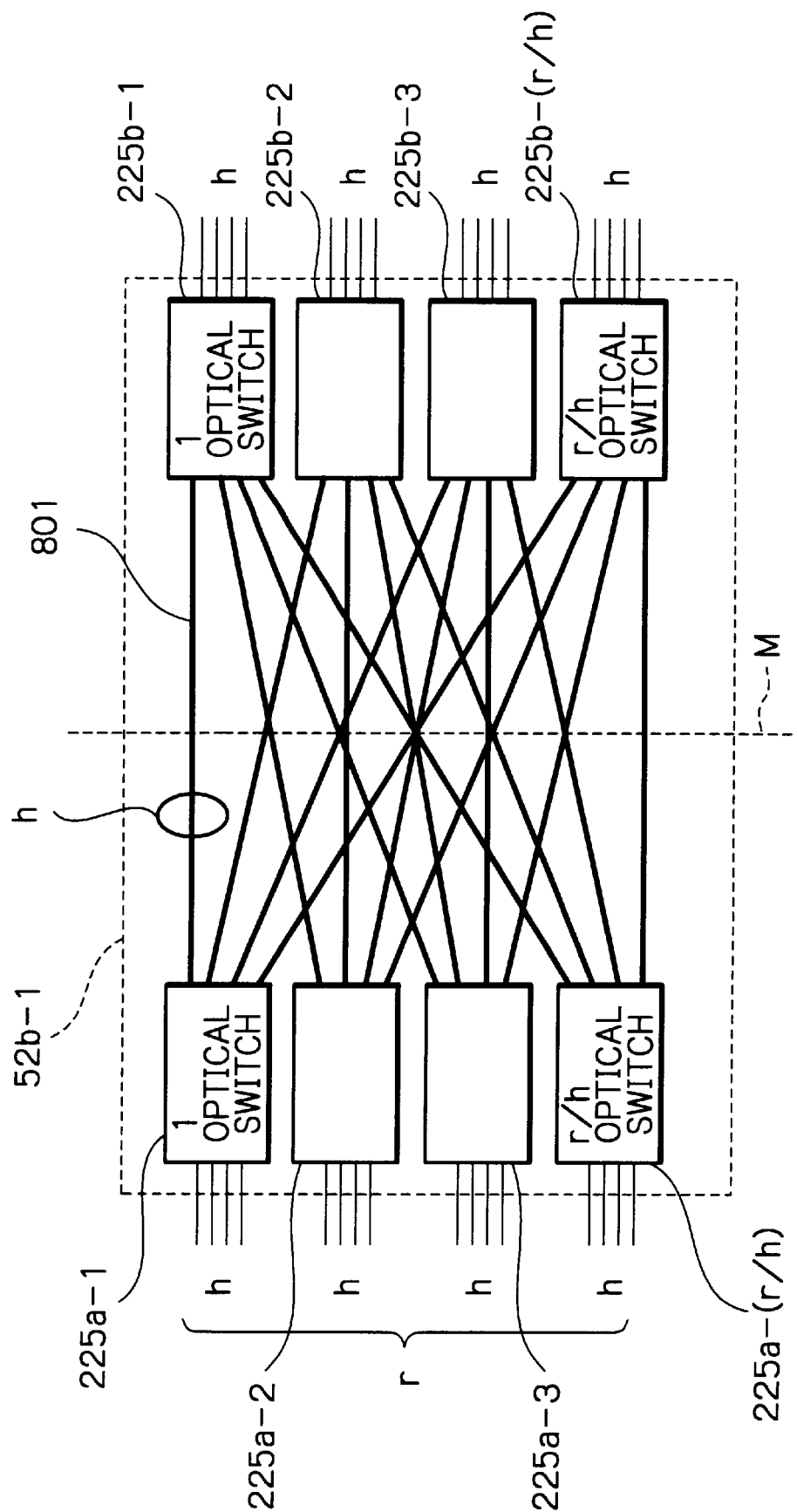
FIG. 6 is a schematic block diagram for describing the configuration of an optical matrix switch included in the network of FIG. 5.

Again, to constitute the matrix switches 202a-1 through 202a-(r/h), assume that the second-stage matrix switches 52b-1 through 52b-m of the conventional network 50 each are divided into an input portion and an output portion at its center, and that the input portion of each of the matrix switches 52b-1 through 52b-m is connected to the first-stage matrix switches 52a-1 through 52a-r. FIG. 6 shows a specific configuration of one of the matrix switches 52b-1 through 52b-m bisected at its center M. Because the matrix switches 52b-1 through 52b-m may have an identical configuration, as stated previously, only the matrix switch 52b-1 will be described by way of example with reference to FIG. 6.

As shown, the r×r matrix switch 52b-1 has r/h groups of h inputs. Optical switches 225a-1 through 225a-(r/h) are arranged at the input side of the matrix switch 52b-1, and each are connected to a particular one of the r/h input groups. Optical switches 225b-1 through 225b-(r/h) are arranged at the output side of the matrix switch 52b-1, and each is connected to a particular one of r/h output groups. In FIG. 6, h is assumed to be 4 for the sake of illustration.

The optical switches 225a-1 through 225a-(r/h) at the input side each have h inputs and r outputs (h×r) while the optical switches 225b-1 through 225b-(r/h) each have r inputs and h outputs (r×h). The optical switches 225a-1 through 225a-(r/h) each are cross-connected to all of the optical switches 225b-1 through 225b-(r/h) by bundles 801 each having h connect lines. Each bundle 801 of h connect lines may be implemented by h optical fibers arranged in the form of a tape or strip.

Each of the m matrix switches 52b-1 through 52b-m includes the above optical switches 225a-1 through 225a-(r/h). It follows that the entire switch circuit network 200 includes m optical switches 225a-1 through m optical switches 225a-r/h. The m optical switches 225a-1 at the input side are therefore considered as a group. In general, m optical switches 225a-i (i being an integer between 1 and r, inclusive) at the input side are considered as a group.

Figure 7:
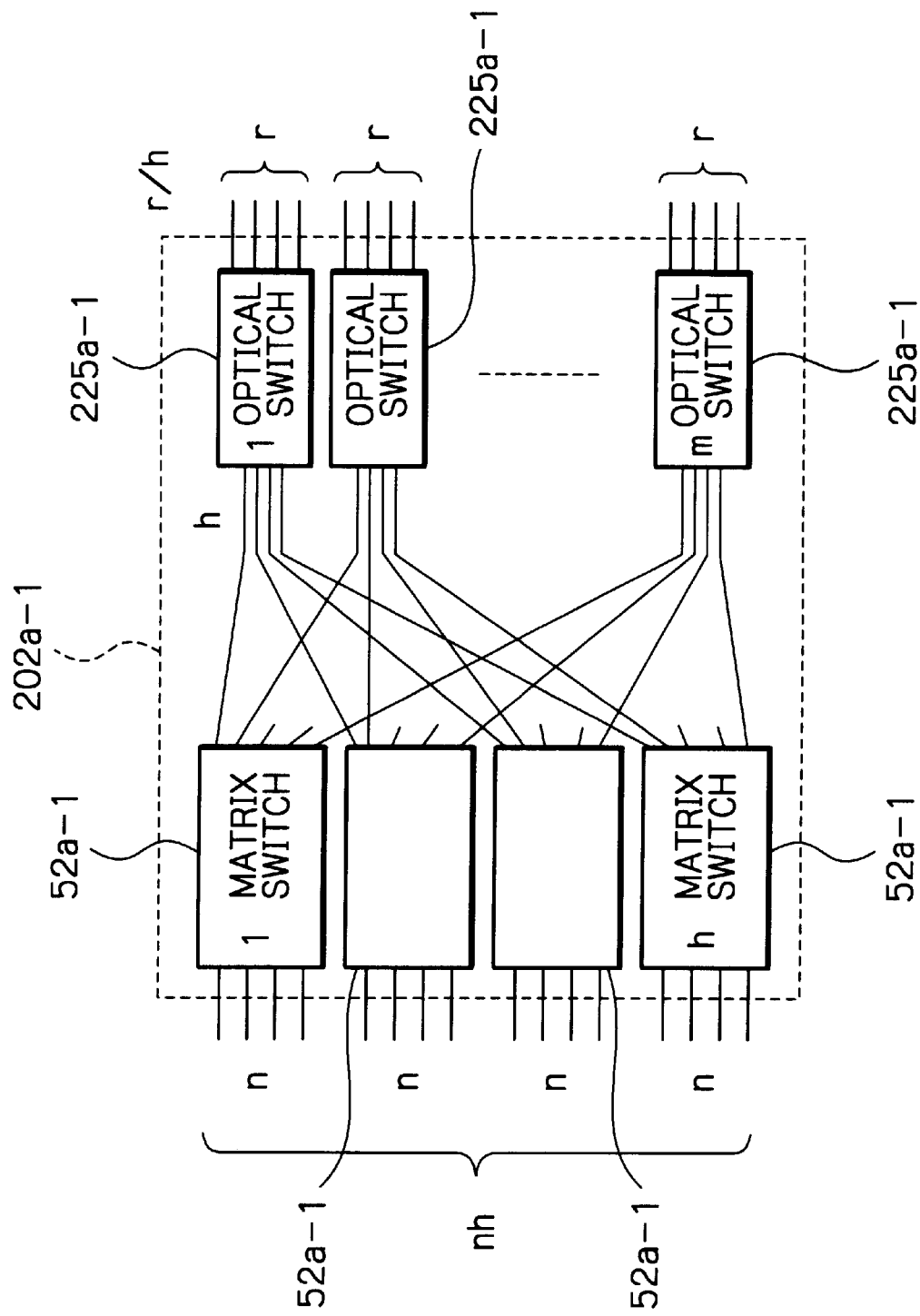
FIG. 7 is a schematic block diagram showing the optical matrix switch included in the network of FIG. 5.

As shown in FIG. 7, the matrix switch 202a-1, FIG. 5, included in the illustrative embodiment is a device implemented by the combination of the above group of m optical switches 225a-1 and h first-stage matrix switches 52a-1. Each matrix switch 52a-1 has n inputs and m outputs, as stated earlier. The n inputs are respectively connected to n of the n×h input ports of the network 200 of the illustrative embodiment while the m outputs are respectively connected to the m optical switches 225a-1. In general, the matrix switch 202a-i (i being an integer between 1 and (r/h), inclusive) of the network 200 is a device implemented by the combination of the group of m optical switches 225a-i and h first-stage matrix switches 52a-i of the conventional network 50.

The matrix switches 202c-1 through 202c-(r/h) at the output side are identical in configuration with the matrix switches 202a-1 through 102a-(r/h) except for the following. The optical switches 225c-1 through 225c-(r/h) of each of the second-stage matrix switches 52b-1 through 52b-m are rearranged in the same manner as at the input side and combined with the third-stage matrix switches 52c-1 through 52c-r of the conventional network 50.

The switch circuit network 200 with the above configuration is also successful to implement the same number of input ports and output ports as the three-stage type network 50 only with two stages of matrix switches.

Another alternative embodiment of the present invention will be described with reference to FIG. 8. As shown, an optical switch circuit network includes matrix switches 302a-1 through 302a-r (see FIG. 9) arranged at the input side and which are the improved version of the matrix switches 102a-1 through 102a-r of the network 100. Because the matrix switches 302a-1 through 302a-r are identical in configuration, the following description will concentrate on the matrix switch 302a-1 shown in FIG. 9. The matrix switches 102b-1 through 102b-r at the output side each are replaced with improved one symmetrical in configuration to the matrix switch 302a-1.

Figure 8:
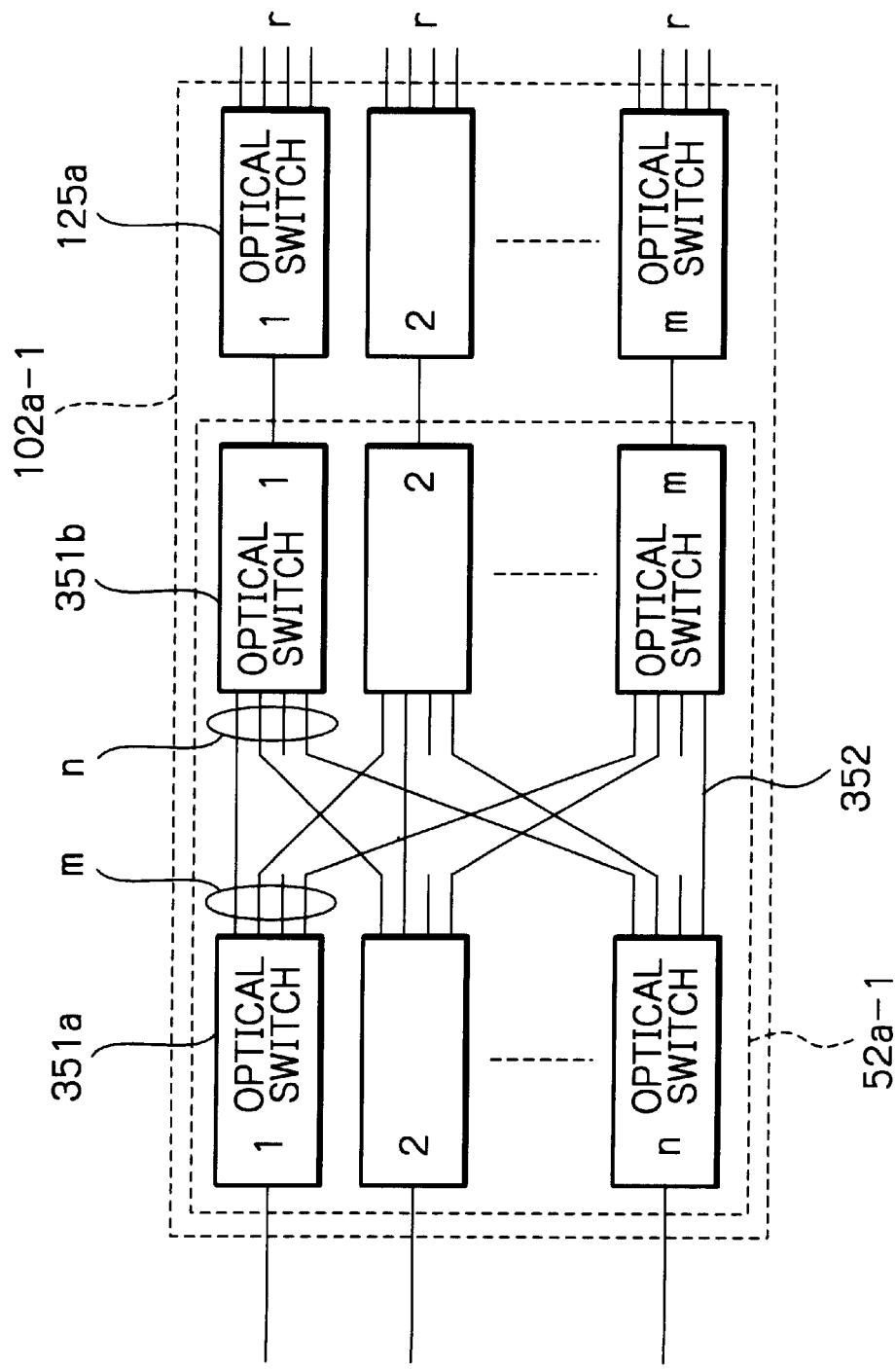
FIG. 8 is a schematic block diagram showing another alternative embodiment of the present invention.

To implement the matrix switch 302a-1 of the illustrative embodiment, assume that the configuration shown in FIG. 8 is substituted for the matrix switch 102a-1 shown in FIG. 4. As shown in FIG. 8, the matrix switch 102a-1 includes the matrix switch 52a-1 having n inputs and m outputs and m optical switches 125a. The matrix switch 52a-1 is made up of n optical switches 351a arranged at the input side and m optical switches 351b arranged at the output side. Each optical switch 351a and each optical switch 351b have a 1×m configuration and an n×1 configuration, respectively. The optical switches 351a each are connected to all of the optical switches 351b by connect lines 352.

In the illustrative embodiment, the above connect lines 352 each are divided into two so as to form a group of n 1×m optical switches 351a and a group of m n×1 optical switches 351b. Then, the m n×1 optical switches 351b each are connected to one of them 1×r optical switches 125a following it, thereby newly constituting n×r optical devices 361 shown in FIG. 9. The optical devices 361 each control the path for a single optical signal.

Figure 10:
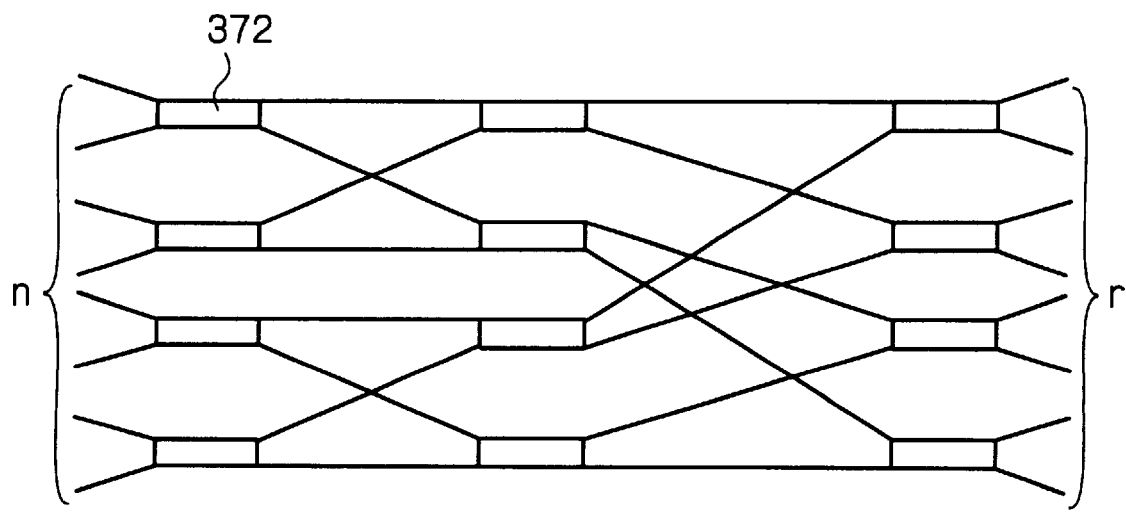
FIGS. 10–12 are schematic block diagrams each showing a specific configuration of an optical device included in the embodiment of FIG. 9.
Figure 11:
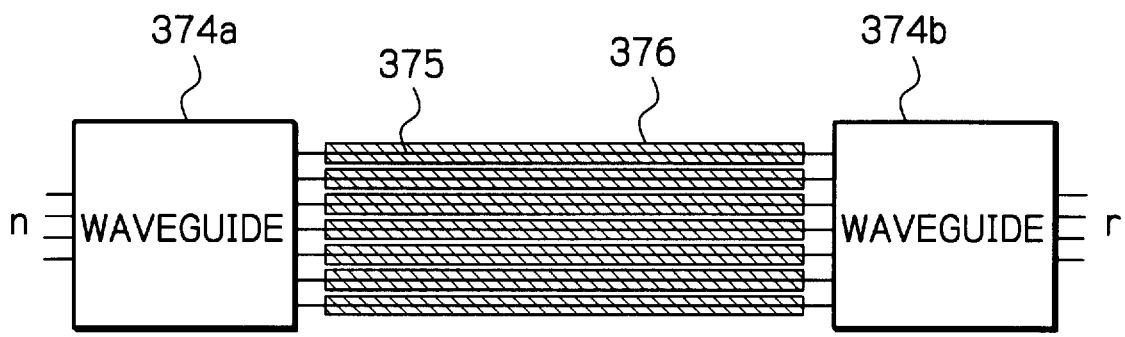
Figure 12:
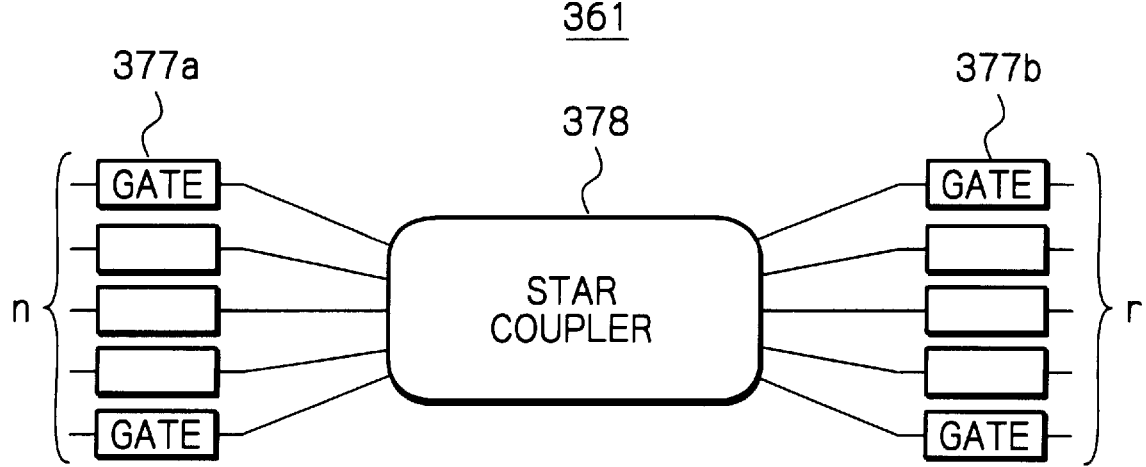

FIGS. 10–12 each show a particular configuration of the above n×r optical device 361. FIG. 10 shows a so-called Banyan network having 2×2 optical devices 372 arranged at $\log_2 r$ consecutive stages. In the Banyan network, paths extend from all of the input ports to all of the output ports. FIG. 11 shows another specific configuration including plane waveguides 374a and 374b and channel waveguides 375 connecting them together. The channel waveguides 375 are provided with phase control electrodes 376. By controlling voltage to be applied to the phase control electrodes 376, it is possible to send an input from a desired input port to a desired output port. FIG. 12 shows still another specific configuration including a star coupler 378 and two groups of optical gates 377a and 377b respectively preceding and following the star coupler 378. The optical gates 377a and 377b between a desired input port and a desired output port are opened to set up a channel via the star coupler 378.

Figure 9:
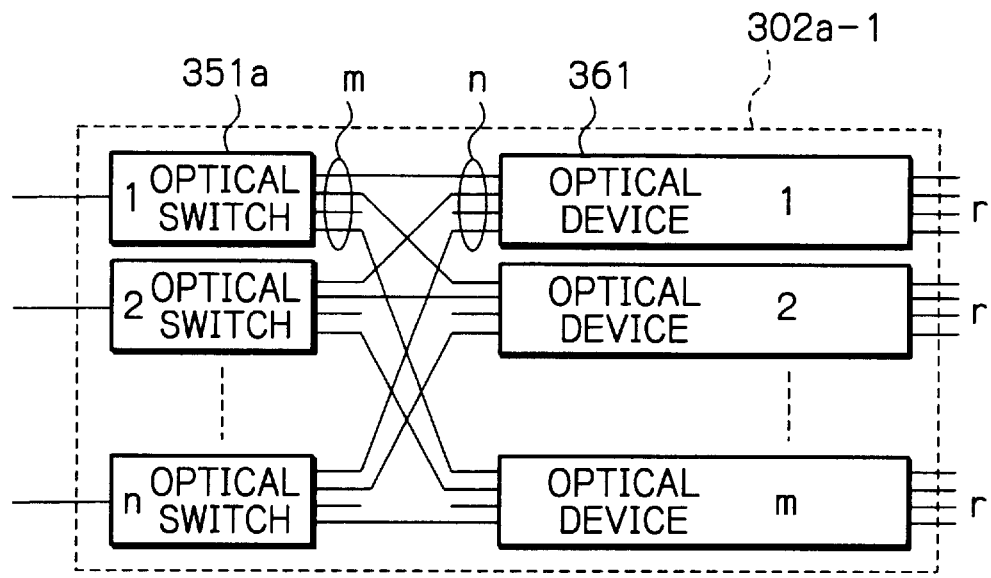
FIG. 9 is a schematic block diagram showing still another alternative embodiment of the present invention.

The device shown in FIG. 7 is also applicable to the 1×m optical switches 351a shown in FIG. 9. Generally, among devices having n inputs and r outputs each, a device capable of controlling only a single path is simpler in configuration than the other devices capable of controlling two or more paths.

As for the number Ts of optical devices included in each of the matrix switches 302a-1 through 302a-r, assume that the 1×m device 351a has a tree configuration of 1×2 optical devices, and that the n×r optical switch 361 has the Banyan configuration shown in FIG. 10. Then, the number Ts is expressed as:

$$Ts = n(m-1) + (mr/2)\log_2 r$$

Assuming that the optical switch scale N is nr, and that m is 2n on the basis of the non-blocking condition of m ≧ 2n−1, then the number Ts is rewritten as:

$$Ts = (N/r)(2N/r-1) + N\log_2 r$$

Assuming that N and r are 64 and 8, respectively, then the number Ts is 8×(16−1)+64×3=312 and substantially equal to the number of optical devices included in a conventional 16×16 scale (N=16) optical matrix switch. In this manner, the illustrative embodiment noticeably reduces the number of optical devices and thereby scales down the individual optical matrix switch.

In addition, the illustrative embodiment makes crosstalk negligible by preventing two or more signals from being input to the 1×m optical switch 351a or the n×r optical switch 361 at the same time.

Figure 13:
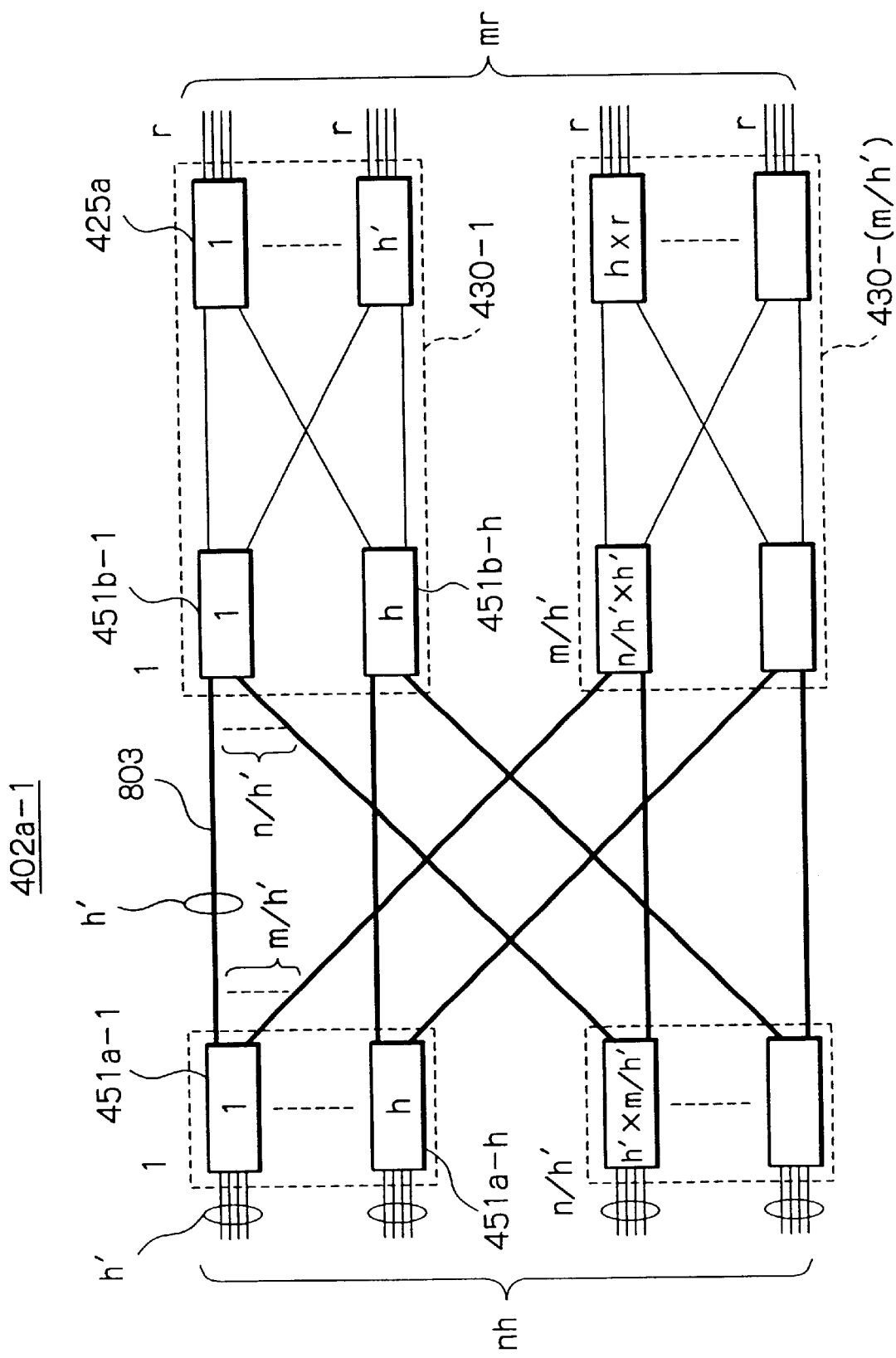
FIGS. 13–17 are schematic block diagrams each showing a further another alternative embodiment of the present invention.
Figure 14:
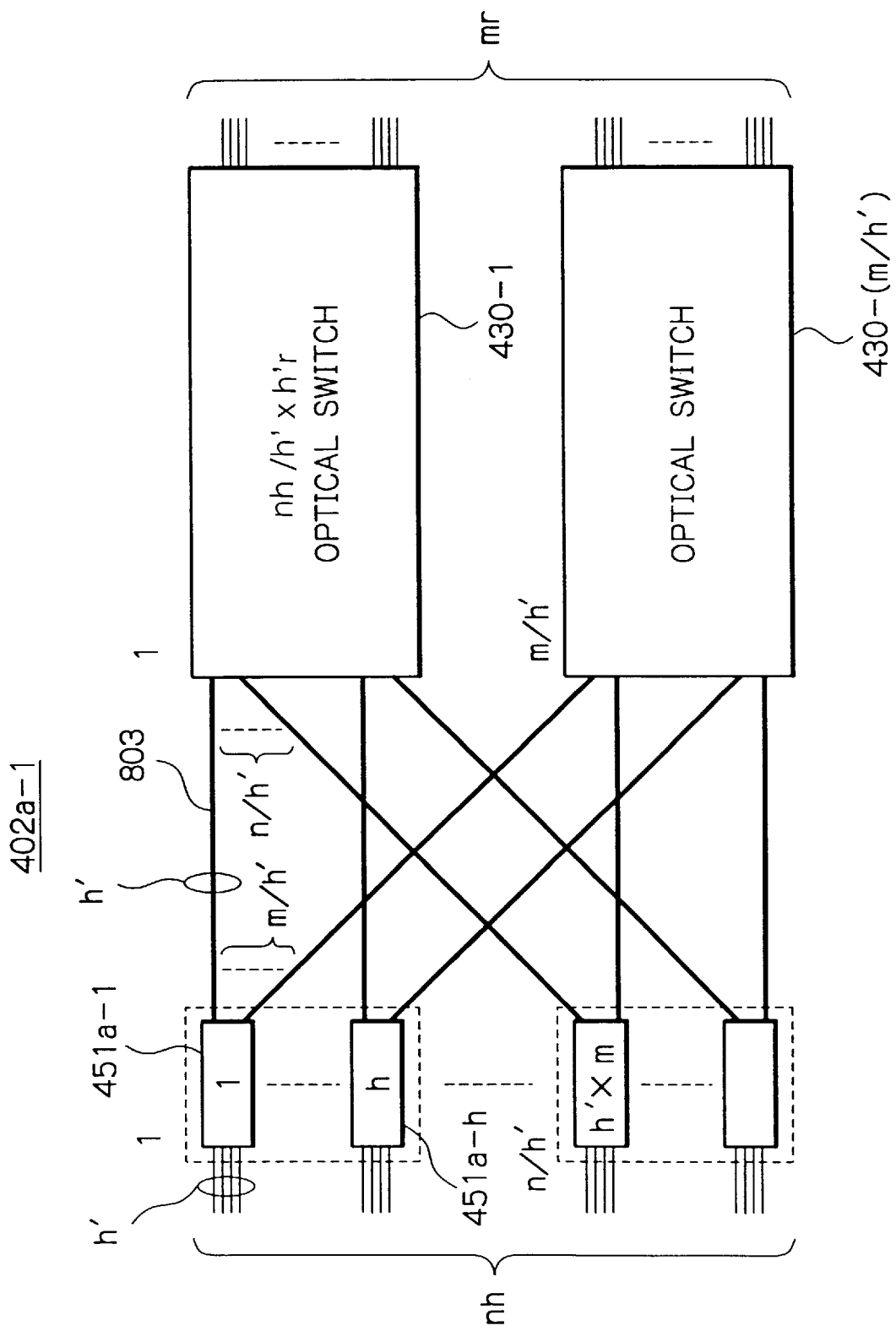

Referring to FIGS. 13 and 14, another alternative embodiment of the present invention will be described which constitutes an improvement over the network 200 shown in FIG. 5. As shown, an optical switch circuit network includes an optical matrix switch 402a-1 arranged at its input side in place of the matrix switch 202a-1 of FIG. 7. Of course, optical matrix switches 402a-2 through 402a-r/h identical in configuration with the matrix switch 402a-1 are substituted for the matrix switches 202a-2 through 202a-r/h of FIG. 5 although not shown specifically. Likewise, the matrix switches 202b-1 through 202b-r/h arranged at the output side each are configured symmetrically to the matrix switch 402a-1 of FIG. 13 in the right-and-left direction.

As shown in FIG. 13, the matrix switch 402a-1 has at its input side n/h' groups of h h'×m/h' optical switches 451a-1 through 451a-h. The nh inputs are divided into groups of h' inputs and connected to nh/h' h'×m/h' optical switches in total. It is to be noted that h, h', m and n are positive integers. The matrix switch 402a-1 has at its output side m/h' nh/h'× h'r optical switches 430-1 through 430-(m/h'). The optical switches 430-1 through 430-(m/h') each are made up of n/h'×h' optical switches 451b-1 through 451b-h and h' h×r optical switches 425a arranged at the input side and output side, respectively. The optical switches 451b and h×r optical switches 425a are cross-connected to each other.

The matrix switch 402a-1 has n/h' groups of h h'×m/h' optical switches 451a-1 through 451a-h, as stated above. The first h'×m/h' optical switch 451a-1 of each group is connected to the first n/h'×h' optical switches 451b-1 of the optical switches 430-1 through 430(m/h') by tape-like optical fibers 803 each having h' connect lines. Generally, the i-th (i being an integer between 1 and h, inclusive) h'×m/h' optical switch 45 1a-i of each group is connected to the i-th n/h'×h' optical switches 451b-i of the optical switches 430-1 through 430-(m/h') by tape-like optical fibers each having h' connect lines.

The configuration of each of the n/h'×h'r optical switches 430-1 through 430-(m/h') shown in FIG. 13 is only illustrative. As shown in FIG. 14, the crux is that each optical switch has any desired nh/h'×h'r optical switches.

The above network is successful to further reduce the number of optical devices of each matrix switch and therefore to further scale down the individual matrix switch.

Figure 15:
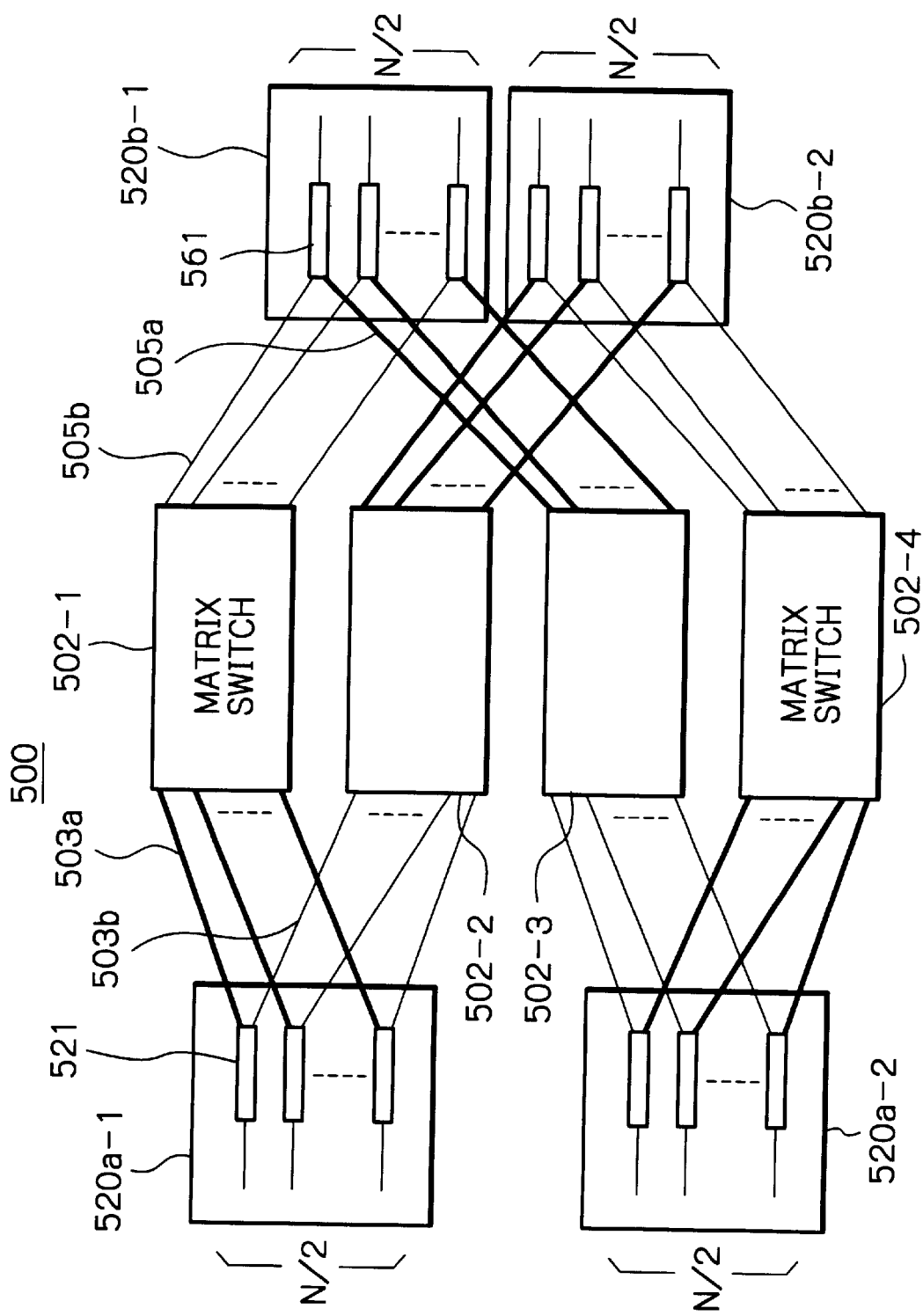

Still another alternative embodiment of the present invention will be described with reference to FIG. 15. As shown, an optical switch circuit network, generally 500, includes a first input section 520a-1 having N/2 (N being a natural number) first input ports and 1×2 optical switches 521 respectively connected to the first input ports. Likewise, a second input section 520a-2 has N/2 second input ports and 1×2 optical switches 521 respectively connected to the second input ports. A first output section 520b-1 has N/2 first output ports and 2×1 optical switches 561 respectively connected to the first output ports. A second output section 520b-2 has N/2 second output ports and 2×1 optical switches 561 respectively connected to the second output ports. N/2×N/2 optical matrix switches 502-1 through 502-4 each set up a particular optical path between the first input ports or the second input ports and the first output ports or the second output ports. The matrix switches 502-1 through 502-4 may be provided with a crossbar configuration by way of example.

More specifically, the 1×2 matrix switches 521 of the first input section 520a-1 each are connected to the matrix switches 502-1 and 502-2. Likewise, the 1×2 optical switches 521 of the second input section 520a-2 each are connected to the matrix switches 502-3 and 502-4. In the illustrative embodiment, the optical switches 521 each are caused to select an adequate path by control means not shown.

In the illustrative embodiment, the optical switches 521 are implemented by TO switches by way of example. In this case, the above control means selectively turns on or turns off drive heaters, not shown, so as to vary the resistances of waveguides and thereby switch the path for an optical signal. This kind of control means using drive heaters will be described specifically. In FIG. 15, the optical switches 521 are assumed to select paths 503a indicated by thick lines when the control means turns on a drive heater, but select paths 503b indicated by thin lines when it turns off the drive heater. Also, assume that the optical switches 561 select paths 505a indicated by thick lines in FIG. 15 when the control means turns on a drive heater, but select paths 505b indicated by thin lines when it turns off the drive heater.

An optical signal input to any one of the input ports of the first input section 520a-1 is sent to the matrix switch 502-1 if the drive heater assigned to the optical switches 521 of the input section 520a-1 is in its ON state. The optical signal is sent to the other matrix switch 502-2 if the above drive heater is in its OFF state. Likewise, an optical signal input to any one of the input ports of the second input section 520a-2 is sent to the matrix switch 502-4 if the drive heater assigned to the input section 520a-2 is in its ON state, but sent to the other matrix switch 502-3 if it is in its OFF state.

The 2×1 optical switches 561 of the first output section 520b-1 are connected to the matrix switches 502-1 and 502-3. The 2×1 optical switches 561 of the second output section 520b-2 are connected to the matrix switches 502-2 and 502-4. An optical signal to be output from any one of the output ports of the first output section 520b-1 is output from the matrix switch 502-3 if a drive heater assigned to the optical switches 561 of the output section 520b-1 is in its ON state, but output from the matrix switch 502-1 if it is in its OFF state. Likewise, an optical signal to be output from any one of the output ports of the first output section 520b-2 is output from the matrix switch 502-2 if a drive heater assigned the output section 502b-2 is in its ON state, but output from the matrix switch 502-4 if it is in its OFF state.

In the above network 500, one of the drive heaters assigned to the input sections 520a-1 and 520a-2 is turned on while the other heater is turned off, without regard to the path through which an optical signal is propagated. This is also true with the drive heaters assigned to the output sections 520b-1 and 520b-2. In addition, when the matrix switches 502-1 through 502-4 are provided with a crossbar configuration, only one optical switch is turned on in each matrix switch. Therefore, assuming that the number of input ports and that of output ports are N, N drive heaters are turned on in the matrix switches and in either one of the connection to the input side of the matrix switches and the connection to the output side of the same, i.e., 2N drive heaters are turned on in total.

In a conventional optical switch circuit network, 3N drive heaters, in the worst case, are turned on at the same time. The illustrative embodiment therefore reduces drive power necessary for the TO switches to ⅔. In addition, the illustrative embodiment is successful to maintain the drive power constant without regard to the path along which an optical signal is propagated.

Moreover, the matrix switches 502-1 through 502-4 with the crossbar configuration and the 1×2 optical switches 521 and 2×1 optical switches 561 are combined in a tree structure. This configuration makes the devices shorter than the conventional crossbar configuration and reduces the drive power to $1/\log_2 N$, compared to the configuration made up of N stages of 1×2 optical switches and 2×1 optical switches.

Figure 16:
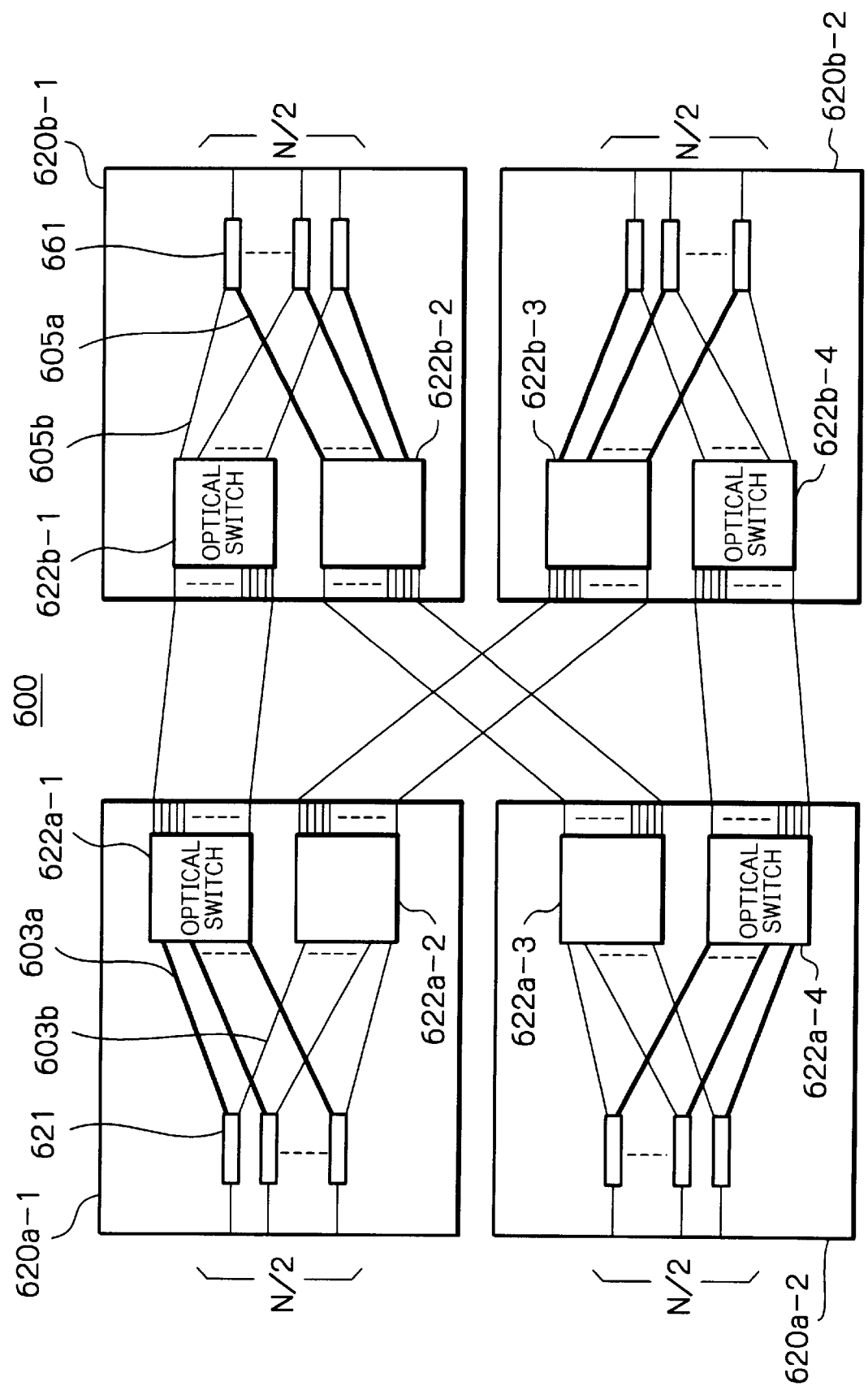

Reference will be made to FIG. 16 for describing yet another alternative embodiment of the present invention. This embodiment is an improved version of the embodiment of FIG. 15 and characterized in that each matrix switch for switching the optical paths is divided at its center and has its two portions integrated with the input section and output section, respectively.

As shown in FIG. 16, an optical switch circuit network, generally 600, includes an input section 620a-1 including N/2 input ports, N/2×N/2 optical switches 622a-1 and 622a-2, and 1×2 optical switches 621 connecting the input ports and optical switches 622a-1 and 622a-2. Likewise, an input section 620a-2 including N/2 input ports, N/2×N/2 optical switches 622a-3 and 622a-4, and 1×2 optical switches 621 connecting the input ports and optical switches 622a-3 and 622a-4. An output section 620b-1 includes N/2 output ports, N/2×N/2 optical switches 622b-1 and 622b-2, and 1×2 optical switches connecting the optical switches 622b-1 and 622b-2 and output ports. An output section 620b-2 includes N/2 output ports, N/2×N/2 optical switches 622b-3 and 622b-4, and 1×2 optical switches connecting the optical switches 622b-3 and 622b-4 and output ports.

The optical switch 622a-1 of the input section 620a-1 is connected to the optical switch 622b-1 of the output section 620b-1. The optical switch 622a-2 of the input section 620a-1 is connected to the optical switch 622b-3 of the output section 620b-2. The optical switch 622a-3 of the input section 620a-2 is connected to the optical switch 622b-2 of the output section 620b-1. Further, the optical switch 622a-4 of the input section 620a-2 is connected to the optical switch 622b-4 of the output section 620b-2.

The network 600 is substantially identical with the previous network 500 as to the connection between the 2×2 optical switches 621 and the optical switches 622a-1 through 622a-4 and the connection between the 2×1 optical switches 661 and the optical switches 622b-1 through 622b-4. Consequently, whichever the path along which an optical signal is propagated to an output port may be, it is necessarily propagated once through a path on which a drive heater is in its ON state (thick line 603a or 605b) and once through a path on which the drive heater is in its OFF state (thin line 603b or 605b).

The network 600 also achieves the advantages described in relation to the network 500. In addition, the network 600 is advantageous in that even when the number N of input ports and output ports is increased, the network 600 can be easily integrated by dividing matrix switches with the above principle.

Figure 17:
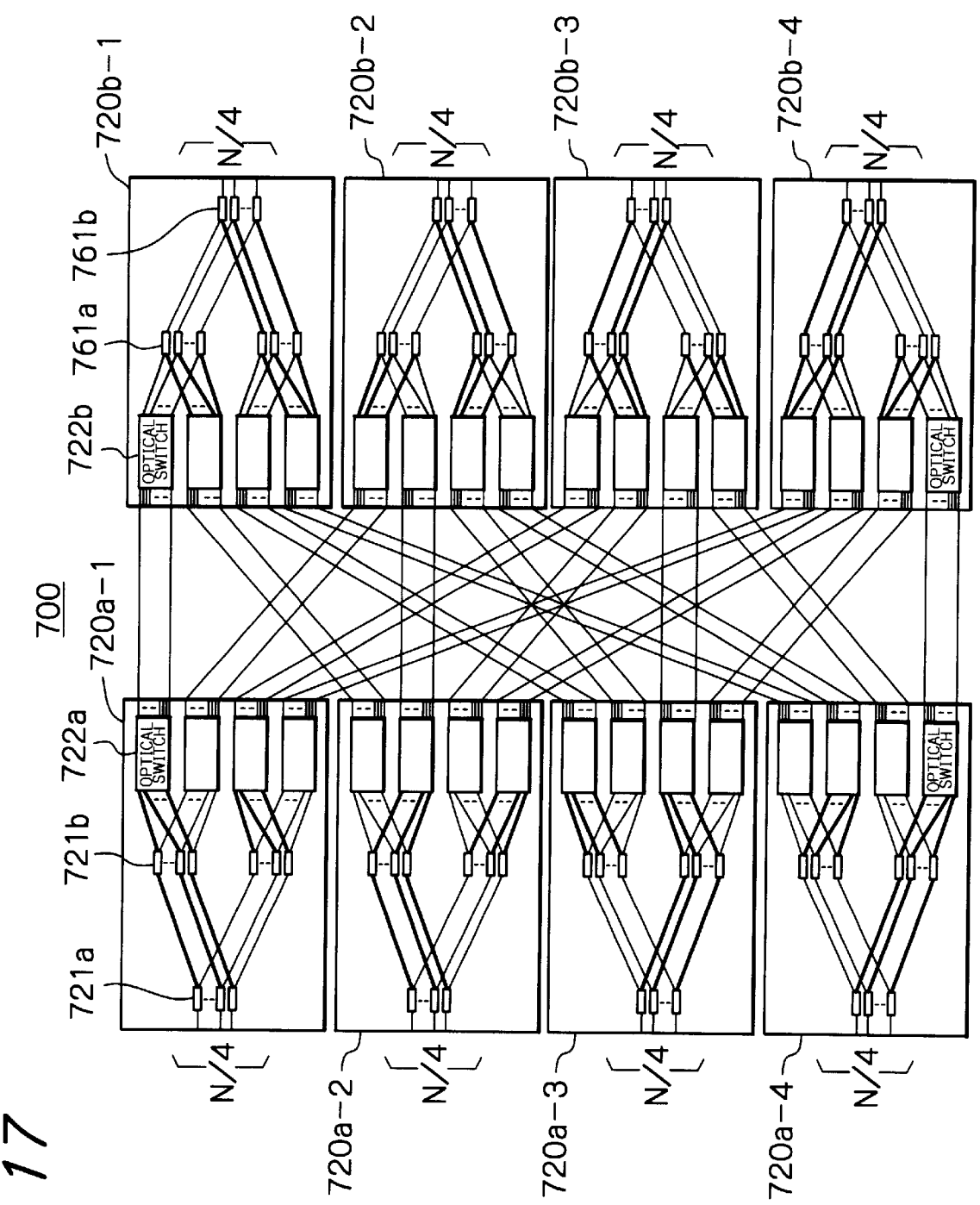

FIG. 17 shows a further alternative embodiment of the present invention which is a further improved version of the above network 600. As shown, an optical switch circuit network, generally 700, includes input sections 720a-1 through 720a-4 and output sections 720b-1 through 720b-4. The input sections 720a-1 through 720a-4 each include 1×2 optical switches 721a and 721b arranged at two consecutive stages in a tree configuration. Likewise, the output sections 720b-1 through 720b-4 each include 2×1 optical switches 761a and 761b arranged at two consecutive stages in a tree configuration.

More specifically, the input section 720a-1 has N/4 input ports and four N/4×N/4 optical switches 722a in addition to the 1×2 optical switches 721a and 721b connecting the input ports and optical switches 722a. The other input sections 720a-2 through 720a-4 have the same configuration as the input section 720a-1. The output section 720b-1 has N/4 output ports and four N/4×N/4 optical switches 722b in addition to the 2×1 optical switches 761a and 761b connecting the output ports and optical switches 722b. The other output sections 720b-2 through 720b-4 are identical in configuration with the output section 720b-1.

In the i-th (i being an integer between 1 and 4, inclusive) input section 720a-I, the j-th (j being an integer between 1 and 4, inclusive) optical switch 722a is connected to the i-th optical switch 722b of the j-th output section 720-j. The N/4 input ports each are selectively connected to one of the four optical switches 722a via the 1×2 optical switches 721a and 721b arranged in a two-stage tree configuration. More specifically, the optical switches 721a and 721b each are driven by a respective drive heater. By selectively turning on and turning off such drive heaters, $2^2$ different paths, i.e., four different paths are available for each input port.

The N/4 output ports each are selectively connected to one of the four optical switches 722b via the 2×1 optical switches 761a and 761b also arranged in a two-stage tree configuration. More specifically, the optical switches 761a and 761b each are driven by a respective drive heater. By selectively turning on and turning off such drive heaters, $2^2$ different paths, i.e., four different paths are available for each output port. The drive heaters of the input side and those of the output side are symmetrical to each other with respect to the ON/OFF state. For example, assume that an optical signal is propagated through any path of the input side on which the drive heater assigned to the optical switches 721a turns on (thick line) and any path on which the drive heater assigned to the optical switches 721b turns off (thin line). Then, at the output side, the above signal is propagated through a path on which the drive heater assigned to the optical switches 761a turns on and a path on which the drive heater assigned to the optical switches 761b turns off.

The above network 700 is capable of using N/4×N/4 optical switches as the optical switches 722a and 722b of the input side. Therefore, the network scale N can be increased without sophisticating the connection between the input ports and the optical switches 722a or the connection between the optical switches 722b and the output ports. By arranging the optical switches in a symmetrical configuration, it is possible to reduce the total drive power of the entire network 700.

In the network 700, only the drive heaters of two of the optical switches 721a, 721b, 761a and 761b are turned on on the path of an optical signal. Required drive power is N in the optical matrix switch and 2N on the path connected to the matrix switch (input or output), i.e., 3N in total.

Assume that the optical switches 721a and 721b or the optical switches 761a and 761b are arranged in $\log_2(N/m)$ stages where m denotes the number of inputs of each matrix switch 722a or the number of outputs of each matrix switch 722b. Then, $\log_2(N/m)+1$ optical switches are turned on. It follows that drive power is reduced to $(\log_2(N/m)+1)/(2\log_2(N/m)+1)$, compared to the case wherein consideration is not given to the drive states of the optical switches 721a and 721b or 761a and 761b.

As stated above, the illustrative embodiment successfully reduces the device length and minimizes an increase in drive power.

The configurations of the devices included in the above illustrative embodiments are only illustrative. Any desired devices may be replaced with each other so long as they are of the same scale. Further, in the embodiments shown in FIGS. 16 and 17, the 1×2 optical switches and 2×1 optical switches each may be arranged in a grater number of stages in order to obviate sophisticated connect paths and to facilitate integration.

In summary, it will be seen that the present invention provides an optical switch circuit network using only two stages of optical matrix switches, scaling down the individual optical matrix switch, and reducing the number of devices. Further, the network of the invention reduces the network length and drive power necessary for TO switches while stabilizing the drive power, and obviates sophisticated connection paths ascribable to the extension of input ports and output ports while promoting easy integration.

The entire disclosure of Japanese patent application No. 35937/1999 filed Feb. 15, 1999 including the specification, claims, accompanying drawings and abstract of the disclosure is incorporated herein by reference in its entirety.

While the present invention has been described with reference to the illustrative embodiments, it is not to be restricted by the embodiments. It is to be appreciated that those skilled in the art can change or modify the embodiments without departing from the scope and spirit of the present invention.

What is claimed is:

1. An optical switch circuit network including nr input ports and nr output ports, n and r being positive integers, comprising:

r/h input matrix switches, h being a positive integer, arranged at an input side of the optical switch circuit network and each comprising nh input ports of the nr input ports, m h×r optical switches and h n×m optical switches each being connected to a group of n input ports of the nr input ports to thereby switch a path between the n input ports and said m h×r optical switches; and r/h output matrix switches arranged at an output side of the optical switch circuit network and each comprising nh output ports of the nr output ports, m r×h optical switches and h m×n optical switches each being connected to a group of n output ports of the nr output ports to thereby switch a path between the n output ports and said m r×h optical switches;

wherein an i-th h×r optical switch, i being an integer between 1 and m, including 1 and m, of each of said r/h input matrix switches is connected to an i-th r×h optical switch of each of said r/h output matrix switches by a tape-like optical fiber constituted by h connect lines, wherein h>1.

2. An optical switch circuit network including nr, n and r being positive integers, input ports and nr output ports, comprising:

r/h input matrix switches arranged at an input side of the optical switch circuit network and each comprising nh input ports of the nr input ports, m/h' nh/h'×h'r optical switches, where h and h' are positive integers, and nh/h' h'×m/h' optical switches each being connected to a group of h' input ports of the nr input ports to thereby switch a path between the h' input ports and said m/h' nh/h'×h'r optical switches; and r/h output matrix switches arranged at an output side of the optical switch circuit network and each comprising nh output ports of the nr output ports, m/h' h'r×nh/h' optical switches and nh/h' m/h'×h' optical switches each being connected to a group of h' output ports of the nr output ports to thereby switch a path between the h' output ports and said m/h' h'r×nh/h' optical switches;

each of said nh/h' h'×m/h' optical switches of each of said r/h input matrix switches being connected to each of said m/h' nh/h'×h'r optical switches of the r/h input matrix switch by tape-like optical fibers each comprising h' connect lines;

each of said m/h' h'r×nh/h' optical switches of each of said r/h output matrix switches being connected to said nh/h' m/h'×h' optical switches of the r/h output matrix switch by tape-like optical fibers each comprising h' connect lines;

each of said r/h input matrix switches being connected to each of said r/h output matrix switches by tape-like optical fibers each comprising h connect lines, wherein h>1.

3. A network in accordance with claim 2, wherein said nh/h' h'×m/h' optical switches of each of said r/h input matrix switches comprise n/h' input optical switch groups, where each group comprises of h h'×m/h' optical switches;

each of said m/h' nh/h'×h'r optical switches of each of said r/h input matrix switches comprises h n/h'×h' optical switches and h' h×r optical switches each being connected to said h n/h'×h' optical switches;

said nh/h' m/h'×h' optical switches of each of said r/h output matrix switches comprise n/h' output optical switch groups, where each group comprises of h m/h'× h' optical switches;

each of said m/h' h'r×nh/h' optical switches of each of said r/h output matrix switches comprises h h'×n/h' optical switches and h' r×h optical switches each being connected to said h h'×n/h' optical switches;

an i-th h'×m/h' optical switch, i being an integer between 1 and h, including 1 and h, in each of said n/h' input optical switch groups of each of said r/h input matrix switches is connected to an i-th n/h'×h' optical switch of each of said m/h' nh/h'×h'r optical switches of the r/h input matrix switch by a tape-like optical fiber comprising h' connect lines;

an i-th m/h'×h' optical switch of each of said n/h' output optical switch groups of each of said r/h output matrix switches is connected to an i-th h'×n/h' optical switch of each of said m/h' h'r×nh/h' optical switches of the r/h output matrix switch by a tape-like optical fiber comprising h' connect lines; and a j-th m/h' nh/h'×h'r optical switch, j being an integer between 1 and m/h', including 1 and m/h', of each of said r/h input matrix switches is connected to a j-th m/h' h'r×nh/h' optical switch of each of said r/h output matrix switches by a tape-like optical fiber comprising h connect lines.

4. An optical switch circuit network for receiving nr input signals and outputting nr output signals, where n and r are positive integers, comprising:

r/h input matrix switches for each receiving nh of said nr input signals, each of said input matrix switches having h n×m input optical switch stages and m h×r input optical switches, each of said input optical switches outputting r signals, and wherein each of said input optical switch stages receives n of said input signals and outputs m signals to said m input optical switches;

r/h output matrix switches for each outputting nh of said nr output signals, each of said output matrix switches having m r×h output optical switches and h m×n output optical switch stages, each of said output optical switches receiving r signals from said input optical switches, and wherein each of said output optical switch stages outputs n of said output signals and receives m signals from said m output optical switches; and a plurality of tape-like optical fibers, each constituted by h connect lines, connecting each of said input optical switches to a corresponding output optical switch, wherein h>1.

5. An optical switch circuit network for receiving nr input signals and outputting nr output signals, where n and r are positive integers, comprising:

r/h input matrix switches for each receiving nh of the nr input signals, each of said input matrix switches having nh/h' h'×m/h' input optical switch stages, where h and h' are positive integers, and m/h' nh/h'×h'r input optical switches, wherein each of said input optical switch stages receives a group of h' input signals and outputs m/h' signals to said input optical switches; and r/h output matrix switches for each outputting nh of the nr output signals, each of said r/h output matrix switches having m/h' h'r×nh/h' optical switches and nh/h' m/h'×h' optical switch stages, each of said output optical switch stages outputs a group of h' signals and receives m/h' signals from said output optical switches;

each of said input optical switch stages of each of said r/h input matrix switches being connected to each of said input optical switches of the r/h input matrix switch by tape-like optical fibers each comprising h' connect lines;

each of said output optical switches of each of said r/h output matrix switches being connected to said output optical switch stages of the r/h output matrix switch by tape-like optical fibers each comprising h' connect lines;

each of said r/h input matrix switches being connected to each of said r/h output matrix switches by tape-like optical fibers each comprising h connect lines, wherein h>1.

6. A network in accordance with claim wherein said input optical switch stages of each of said r/h input matrix switches form n/h' input optical switch groups, where each group comprises of h h'×m/h' optical switches;

each of said input optical switches of each of said r/h input matrix switches comprises h n/h'×h' optical switches and h' h×r optical switches each being connected to said h n/h'×h' optical switches;

said output optical switch stages of each of said r/h output matrix switches form n/h' output optical switch groups, where each group comprises of h m/h'×h' optical switches;

each of said output optical switches of each of said r/h output matrix switches comprises h h'×n/h' optical switches and h' r×h optical switches each being connected to said h h'×n/h' optical switches;

each h'×m/h' optical switch in each of said n/h' input optical switch groups of each of said r/h input matrix switches is connected to a corresponding n/h'×h' optical switch of each of said input optical switches of the r/h input matrix switch by a tape-like optical fiber comprising h' connect lines;

each m/h'×h' optical switch of each of said nih' output optical switch groups of each of said r/h output matrix switches is connected to a corresponding h'×n/h' optical switch of each of said output optical switches of the r/h output matrix switch by a tape-like optical fiber comprising h' connect lines; and each input optical switch of each of said r/h input matrix switches is connected to a corresponding output optical switch of each of said r/h output matrix switches by a tape-like optical fiber comprising h connect lines.

7. An optical switch circuit network including N input ports and N output ports, comprising:

$2^n$ input sections each comprising $N/2^n$ of said N input ports, $2^n N/2^n \times N/2^n$ input optical switches, and 2×1 optical switches arranged in an n-stage tree configuration and connecting said input ports and said input optical switches; and $2^n$ output sections each comprising $N/2^n$ of said N output ports, $2^n N/2^n \times N/2^n$ output optical switches, and 2×1 optical switches arranged in an n-stage tree configuration and connecting said output ports and said output optical switches;

a j-th (j being an integer between 1 and $2^n$, inclusive) input optical switch of an i-th (i being an integer of $2^n$ or smaller) input section being connected to an i-th output optical switch of a j-th output section.

8. A network in accordance with claim 7, wherein the j-th input optical switch of the i-th input section and the i-th output optical switch of the j-th output section constitute an $N/2^n \times N/2^n$ optical switch.

* * * * *